Nov. 19, 1957 J. DE BOURGUES 2,813,601
SPEED REGULATING BRAKE FOR REELS
Filed Sept. 18, 1953

Inventor:
Jacques de Bourgues
by J. Delattre-Seguy
Attorney

United States Patent Office 2,813,601
Patented Nov. 19, 1957

2,813,601
SPEED REGULATING BRAKE FOR REELS

Jacques de Bourgues, Paris, France, assignor to Paul Defontenay, Bourg-La-Reine, France Application September 18, 1953, Serial No. 381,065

Claims priority, application France October 1, 1952

5 Claims. (Cl. 188—92)

The present invention has for an object a novel torque transmitting device and devices which include applications of the latter.

The torque transmitting device, according to the invention, is substantially characterized by the fact that it comprises a brake controlling either directly or indirectly the shaft, the torque of which is to be adjusted and means for adapting the rotation speed of this shaft to the power absorbed by the latter according to a predetermined rule.

Further features and advantages of the invention will appear from the following specification, and from the appended drawings, in which.

As shown by these various figures, the torque transmitting device, according to the invention, may have different applications and accordingly different results.

Figures 1, 2:
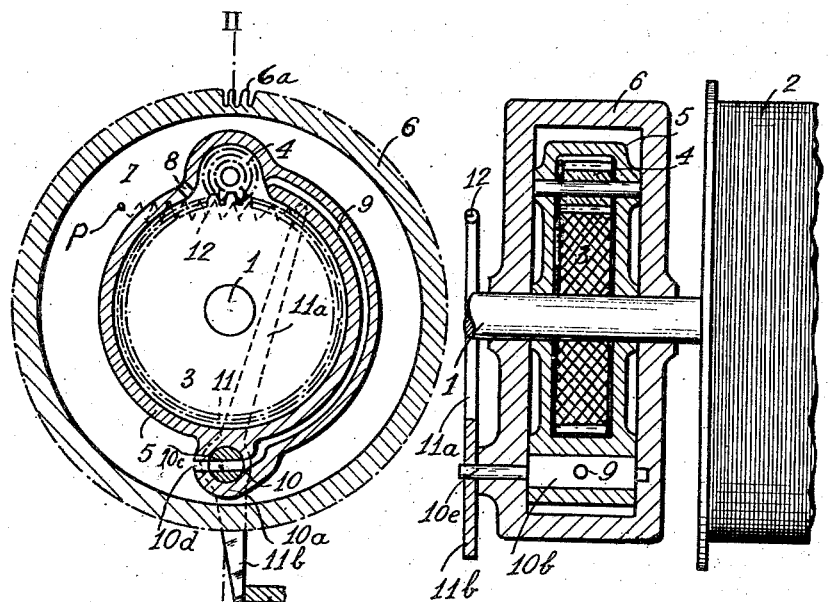
Figures 1 and 2 show a cross sectional drawing of one application of the torque transmitting device permitting to obtain a constant speed of a strand being unwound from a spool.

Figures 1 and 2 refer to one of these applications, the braking of one shaft, the shaft in this particular case being driven through the rotation of a reel, caused by a tension exerted on the wire or thread constituting the winding of the reel.

A sun-wheel 3 engaging with a planet-wheel 4 lodged in a casing 5 is keyed on the shaft 1 supporting the reel 2, the said shaft being the object of the braking, that is for braking the rotation of the said reel, and in such a manner that this sun wheel 3 and related planet-wheel 4 will constitute a gear pump.

The casing 5 will be advantageously placed co-axially to an airtight envelope 6 the outer surface of which may be constituted by cooling blades 6a. The interval 7 formed between the casing 5 and the envelope 6 is filled with an incompressible fluid such as oil for instance. A duct 8 joins this interval 7 with the inlet of the pump 3—4—5, while a second duct 9 joins the outlet of the said pump to this reservoir space interval 7.

According to the invention, duct 9 is provided with a valve 10 for throttling or obturating this duct, causing thus a pressure loss in the hydraulic circuit.

By preference, the duct 9 and the body 10a of the valve are bored in the wall of the casing 5, the duct 9 and the rough shape of the element 10a being formed solid during the casting of this casing.

The shaft 10b of the valve 10 is bored forming a hole 10c the cross-section of which is equivalent to the cross-section of the duct 9 and connects the latter hydraulically with the space interval 7 through a duct 10d bored through the wall of the body 10a.

The shaft 10b extends at 10e through the casing walls 5 and 6 permitting thus to fit a controlling element such as the lever 11, for instance.

It will be remarked that, in the above described device, the whole assembly could rotate together with the braked shaft 1; it is therefore desirable that a resistance point be introduced in the system for constituting an anchoring point for the reaction force causing the braking.

As shown, lever 11, which pivots with the shaft 10b of the movable element of valve 10, is provided with a first arm 11a and with an extension arm 11b, respectively on both sides of the pivot point; arm 11a is connected to a fixed point by means of spring 12, which tends to limit the pivoting of arm 11a and by means of which arm 11b presses against an abutment. Casings 5 and 6 are movable and oscillable; their angular motion is limited on the one hand by the contact of arm 11b against its abutment, and on the other hand by the reaction of arm 11a against spring 12.

One end of spring 12 (Fig. 1) is connected with lever 11 at its arm 11a. The other end of said spring 12 is attached to the fixed point, shown in the drawings at P and located on the casing 6, in any suitable manner. The abutment A against which arm 11b presses is also fixed and is a part of, or an extension rigidly connected with, a base, not shown in the drawings, in any well known manner. It will be understood that, in the hydraulic system involved herein, the valve 10 must remain at its position of average or median opening when the speed of revolution of shaft 1 is normal; and that valve 10 must return to said median position after variations in its opening due to variations in the speed of the shaft 1. In the construction shown, it is therefore useful and required that casings 5 and 6, if they have been angularly displaced for the purposes fully disclosed herein, should return to their respective initial positions; this can be accomplished only if the relative displacement of lever 11 and its associated parts 11a and 11b with respect to the casings 5 and 6 is limited or restrained in one direction by a point of reaction, namely abutment A, and in the other direction by the powerful action of a spring such as 12 which acts as a means to return the lever 11 and the valve 10 to the relative normal positions.

It will be observed that, when the resistant torque tends to increase, if the valve body has been placed in a mean position for the desired torque value, the stator, fundamentally casing 5, and in the illustration of Figs. 1 and 2, the assembly of the oscillating elements, casings 5 and 6, will tend to rotate, modifying thus the relative positions of the valve cock and of the valve body, and accordingly causing a loss in the hydraulic pressure, this provoking a variation in the braking re-establishing the balance for the predetermined torque value until it eventually stops the shaft 1 completely.

From the foregoing, the principle of operation of this device can be stated as follows: shaft 1, which is to be controlled, rotates by entrainment either with a motor or by the unwinding of the thread or wire wound on reel 2. On shaft 1, inside casing 5, there is attached the sun-wheel 3, which forms with planet-wheel 4 a gear pump and controls the operation of said pump. The rotation of shaft 1, therefore, causes the said pump to operate; and the output of said hydraulic pump is directly in function of the speed of rotation of shaft 1. If casing 5 were free, it might revolve by entrainment by shaft 1, as a result of the action of frictional resistances. It would therefore be desirable to immobilize casing 5 in order that the gearing of the elements of the pump be entirely devoted to the hydraulic flow through the pump. It is apparent that if the planet-wheel courses over the periphery of sun-wheel 3, the speed of the pump varies: it either increases or decreases. However, the device herein prevents the free rotation of casing 5, while preserving the possibility of a limited angular displacement for said casing 5. This is the result of the fact that the liquid output of the pump is subjected to the control of valve 10. Since the liquid is not compressible, the operation of the pump is facilitated or braked by the column of liquid contained in duct 9. If valve 10 is closed, the liquid cannot flow, the pump stops, and since sun-wheel 3 is fixed on shaft 1, the latter also stops. Consequently, in order to regulate the speed of rotation of shaft 1, it is sufficient to suitably operate valve 10, thereby regulating the output of pump 3—4. For this purpose, use is made, as stated, of the lever 11 connected to the valve cock 10b and of fixed point P, and of abutment A. As a result, the valve cock and lever 11 are relatively fixed in space, and the center of the valve cock and of lever 11 are adapted to describe an arc of circle having for center the center of shaft 1 and for radius the distance between the latter center and the center of the valve. The body of the valve 10 and, therefore, casing 5 are movable.

Figure 3:
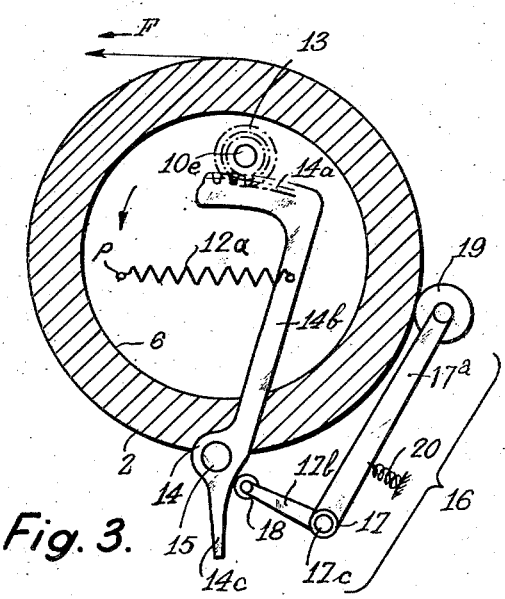
Figure 3 illustrates one application of the torque transmitting device for obtaining a predetermined variable torque braking (unwinding of a coil reel insuring a constant tension of the coiled element).

If care is taken to select for lever 11 a position corresponding to the average or median opening of valve 10, it is apparent that a small angular displacement, negative or positive, of casing 5 will modify the output of hydraulic pump 3—4, and thereby the speed of shaft 1. The actions and reactions herein described are in part the result of the fact that liquids are uncompressible. When in this description, it is made reference to the control of the speed of shaft 1, it must be understood that the variation of said speed can be subjected to outside factor, such as torque. Figure 3 illustrates diagrammatically an application of the torque transmitting device to a predetermined torque variation such as this occurs for instance when unrolling reels while maintaining a constant tension on the coiled element.

The outer circle 2 represents the outer layer of the coiled material, the inner circle 6 corresponding to the periphery of the coupling device (casing 6).

As regards demultiplication, a pinion gear 13 is keyed on the extension shaft 10e of the valve and, in place of the lever 11, the said pinion gear engages with a geared sector 14a ending one arm 14b of a lever 14 pivoted on a shaft 15 integral with the casing 6, while another arm 14c of lever 14, extending beyond shaft 15 is controlled by the control mechanism replacing the abutment A of the preceding examples. The lever 14 is urged by a spring 12a for counteracting the impulse of the movable abutment 18 in the assembly of the pivoting system.

In the case where a material wound on a reel 2 under a constant tension is being unwound, a feeler 16, is used, usually known in the trade as a "jack," constituted by an angled lever 17 pivoted at the heel about a fixed point (shaft 17c) the arms 17a and 17b of which end each by a yoke between the flanges of which pivot respectively rollers 19 and 18; the roller 18 supported by the arm 17b presses against the lever arm 14c, whereas the roller 19 pivoted at the end of the lever arm 17a rolls tangentially on the outer surface of the coiled layer, and a spring 20 aids the lever 17a in this action.

Attention is brought to the fact that the constant contact point between the roller 18 and the lever 14c is variable according to the diameter of the coiled layer.

What I claim is:

1. In a torque controlling device for braking a shaft, in combination: a volumetric hydraulic gear pump, one gear of said pump being keyed to said shaft; a first casing enclosing said pump; a second casing surrounding said first casing; the space between said two casings forming a hydraulic reservoir; a pump inlet for said pump from said reservoir through said first casing; a pump outlet discharging through said first casing into said reservoir; said pump inlet, said pump, said pump outlet and said reservoir forming a hydraulic circuit; a valve on said hydraulic circuit and in said first casing, said valve comprising an inner movable element angularly movable relative to said hydraulic circuit; a shaft for said movable element, said shaft having an extension at least through said first casing; a double arm pivoting lever; a pivot for said lever integral with at least one of said casings; said lever being operatively connected with the movable element of said valve, whereby the pivoting of said lever controls the degree of opening of said movable element relative to said hydraulic circuit in response to the speed variations of said shaft; said pivoting lever comprising a first arm on one side of the pivot, and a second arm on the other side of the pivot; a loaded spring between a fixed point and the said first arm; an abutment for said second arm; said loaded spring and said abutment being constructed and adapted to limit the angular displacement of said lever.

2. A torque controlling device as claimed in claim 1, in which said movable element of said valve extends by said shaft through said first casing and at least into a wall of said second casing, and in which the angular displacement of said lever relative to said second casing causes the angular motion of the said movable element.

3. A torque controlling device as claimed in claim 1, in which said shaft for said movable element of said valve and said pivot for said lever have a common axis.

4. A torque controlling device as claimed in claim 1, comprising further: a pinion fitted on said shaft extension for said movable element of said valve; a geared sector at the free end of said first arm of said lever; said geared sector engaging said pinion.

5. A torque controlling device as claimed in claim 1, in which said abutment comprises a second lever, a terminal roller engaging said second arm, said terminal lever being pivotable with said second lever, said second lever having an arm pivoting on a fixed axis, said second lever having a second terminal roller engaging the periphery of a mobile part connected with said shaft.

References Cited in the file of this patent

UNITED STATES PATENTS

| | | |
|---|---|---|
| 873,621 | Schwarz | Dec. 10, 1907 |
| 1,132,746 | Sundh | Mar. 23, 1915 |
| 1,306,872 | Weston | June 17, 1919 |
| 1,372,986 | Sundh | Mar. 29, 1921 |
| 1,652,299 | Carpenter | Dec. 13, 1927 |
| 2,086,277 | McCleary | July 6, 1937 |
| 2,087,638 | Clark | July 20, 1937 |
| 2,329,594 | Corrigan | Sept. 14, 1943 |
| 2,418,625 | Cornelius | Apr. 8, 1947 |
| 2,420,305 | Donahew et al. | May 13, 1947 |
| 2,514,449 | Klavon | July 11, 1950 |
| 2,563,660 | Rebut et al. | Aug. 7, 1951 |